(12) United States Patent
Haepp et al.

(10) Patent No.: US 9,762,718 B2
(45) Date of Patent: Sep. 12, 2017

(54) METHOD FOR CHANGING OVER DOMESTIC APPLIANCES BETWEEN AN AT-HOME MODE AND A NOT-AT-HOME MODE, PORTABLE OPERATING APPARATUS, SYSTEM AND COMPUTER PROGRAM PRODUCT

(71) Applicant: BSH HAUSGERAETE GMBH, Munich (DE)

(72) Inventors: Claudia Haepp, Vaterstetten (DE); Ingo Pietsch, Munich (DE); Duc Hanh Bui Tran, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/101,082

(22) PCT Filed: Dec. 12, 2014

(86) PCT No.: PCT/EP2014/077478
§ 371 (c)(1),
(2) Date: Jun. 2, 2016

(87) PCT Pub. No.: WO2015/091230
PCT Pub. Date: Jun. 25, 2015

(65) Prior Publication Data
US 2017/0026506 A1    Jan. 26, 2017

(30) Foreign Application Priority Data
Dec. 18, 2013    (DE) .................. 10 2013 226 390

(51) Int. Cl.
*H04M 3/00*    (2006.01)
*H04M 1/725*    (2006.01)
(Continued)

(52) U.S. Cl.
CPC ...... *H04M 1/72533* (2013.01); *H04L 12/282* (2013.01); *H04L 12/2829* (2013.01);
(Continued)

(58) Field of Classification Search
USPC .................. 455/420; 340/815.4, 12.5, 12.29
See application file for complete search history.

(56) References Cited

U.S. PATENT DOCUMENTS 6,820,801 B2    11/2004   Kaneko et al.
8,350,697 B2     1/2013   Trundle et al.
(Continued)

FOREIGN PATENT DOCUMENTS

DE       102009052952 A1    9/2010

*Primary Examiner* — David Q Nguyen
(74) *Attorney, Agent, or Firm* — Laurence A. Greenberg; Werner H. Stemer; Ralph E. Locher

(57) ABSTRACT

A method for controlling a plurality of domestic appliances with the aid of a portable operating apparatus which wirelessly communicates with the domestic appliances includes transmitting a control signal from the portable operating apparatus to the domestic appliances and using the control signal to jointly change over the domestic appliances between an at-home mode, in which first settings are made in the domestic appliances, and a not-at-home mode, in which second settings are made in the domestic appliances. The portable operating apparatus receives an operator input which is carried out by a user using an input device of the portable operating apparatus, and the control signal for changing over the domestic appliances is emitted by the portable operating apparatus on the basis of the operator input.

16 Claims, 2 Drawing Sheets

(51) Int. Cl.
*H04L 12/28* (2006.01)
*H04L 29/08* (2006.01)
*H04W 4/00* (2009.01)
*H04W 4/02* (2009.01)
*H04W 52/02* (2009.01)

(52) U.S. Cl.
CPC .............. *H04L 67/125* (2013.01); *H04W 4/00* (2013.01); *H04W 4/021* (2013.01); *H04W 52/028* (2013.01); *H04L 2012/285* (2013.01); *H04L 2012/2841* (2013.01); *Y02B 60/50* (2013.01)

(56) References Cited

U.S. PATENT DOCUMENTS

| | | | |
|---|---|---|---|
| 2004/0152460 A1 | 8/2004 | La et al. | |
| 2007/0046493 A1* | 3/2007 | Park | H04L 12/2803 340/12.29 |
| 2007/0112939 A1 | 5/2007 | Wilson et al. | |
| 2012/0179547 A1 | 7/2012 | Besore et al. | |
| 2012/0268286 A1* | 10/2012 | Jin | H04L 12/2807 340/815.4 |
| 2014/0095684 A1* | 4/2014 | Nonaka | H04L 12/2818 709/223 |
| 2014/0167929 A1* | 6/2014 | Shim | G08C 17/02 340/12.5 |

\* cited by examiner

METHOD FOR CHANGING OVER DOMESTIC APPLIANCES BETWEEN AN AT-HOME MODE AND A NOT-AT-HOME MODE, PORTABLE OPERATING APPARATUS, SYSTEM AND COMPUTER PROGRAM PRODUCT

BACKGROUND OF THE INVENTION

Field of the Invention

The invention relates to a method for controlling a plurality of domestic appliances with the aid of a portable operating apparatus, which communicates wirelessly with the domestic appliances and, as part of this communication, transfers a control signal to the domestic appliances, with which the domestic appliances are changed over jointly from an at-home mode to a not-at-home mode. In the at-home mode first settings are made at the domestic appliances, while in the not-at-home mode second settings are made at the domestic appliances. The invention also relates to a portable operating apparatus for carrying out such a method, to a system with a plurality of domestic appliances and to a portable operating apparatus, as well as to a computer program product with a data medium on which a computer program for carrying out the inventive method is stored.

Equipping domestic appliances with a communication device via which wireless communication can be carried out with a mobile communication device is already the prior art. The data communication between the domestic appliances on the one side and a mobile terminal on the other side can be carried out in such cases directly using a wireless home network, such as a WLAN network for example. On the other hand the data communication can also be undertaken using an Internet server as an agent, wherein here domestic appliances can communicate with the Internet server via a WLAN router for example. Usually the data communication is carried out via the home network while the portable terminal is within range of this network. If the portable terminal is located outside the range of this network, data communication then takes place via the Internet server. If a cell phone is used as a portable terminal for example, the communication link to the Internet server is established via a cellular radio network.

Data communication between domestic appliances on the one side and an Internet server or a portable communication terminal on the other side is made possible by the "Home Connect" system for example, which is offered by the applicant's company.

The invention is based on a system as described in the document DE 10 2009 052 952 A1. This document discloses a presence notifier for dwelling units, which comprises at least one mobile transmitter, which has remote communication means available to it, wherein the transmitter is embodied as a cell phone for example. Disposed in the dwelling unit is a receiver, which can receive a signal transmitted by the transmitter and can thus detect the presence of the transmitter in the dwelling unit. If the presence of the transmitter is detected, electrical appliances with are located in the dwelling unit are changed over from a not-at-home mode into an at-home mode. This changeover can for example include that a light is to be switched on, a door is to be opened or a window is to be tilted. The changeover from a not-at-home mode to an at-home mode is made automatically here as a result of the detection of the cell phone in the dwelling unit. Optionally there can also be provision here for the cell phone to include a navigation system, through which the said states can already be initiated in advance. Thus for example heating can already be activated in advance when the cell phone comes within a predetermined distance of the dwelling unit.

In the said prior art the situation that the changeover between the at-home mode and the not-at-home mode is always made automatically and thus without regard to the user, i.e. even when this change over is not currently desired by the user, can be seen as a disadvantage. This can for example be the case if the user is only staying in the dwelling unit for a short time. Were specific domestic appliances now to be activated or other settings made automatically, this not only leads to irritation for the user, but also increases the energy consumption.

BRIEF SUMMARY OF THE INVENTION

The object of the invention is to demonstrate a way as to how, with a method of the generic type mentioned at the start, the changeover between the at-home mode and the not-at-home mode can be made possible in a more demand-driven manner.

This object is achieved in accordance with the invention by a method, by a portable operating apparatus, by a system and also by a computer program product with the features in accordance with the respective independent claims. Advantageous embodiments of the invention are the subject matter of the dependent patent claims, the description and the figures.

In an inventive method a plurality of domestic appliances are controlled with the aid of a portable operating apparatus, which communicates wirelessly with the domestic appliances. Through the portable operating apparatus a control signal is communicated to the domestic appliances, with which the domestic appliances can be switched jointly between an at-home mode, in which first settings are made at the domestic appliances, and a not-at-home mode, in which second settings different from the first settings are made. In accordance with the invention there is provision for an operator input to be received by the portable operating apparatus, which is made by a user via an input device of the portable operating apparatus, and the control signal for changing over the domestic appliances is transmitted by the portable operating apparatus as a result of the received operator input and thus directly as a result of this operator input.

Unlike in the prior art, the user is thus given the opportunity of deciding himself when the domestic appliances are to be changed over to the at-home mode and when they are to be changed over to the not-at-home mode. By corresponding user inputs at the portable operating apparatus the changeover between the two modes can thus be made in line with demand and depending on the situation by the user, whereby overall situations can be prevented in which there is an unwanted changeover from the one mode into the other mode. The manual changeover is consequently especially user-friendly and also insures that electrical energy can be saved. Situations can namely be prevented in which there is unwanted activation of domestic appliances, when the user is only in the dwelling unit for a short time.

For example there can be provision for the at-home mode and the not-at-home mode to be assigned individual functions and/or device states and to be stored in a memory. The user can thus, by activating the at-home mode and/or the not-at-home mode, bring the domestic appliances into a state defined in advance by him, e.g. reduced power consumption, deactivation, indications on a display and the like. Basically scenarios or collections of different functions are possible that the user can activate or deactivate by the user input.

A domestic appliance is understood here especially as a device that is employed for domestic management. This can especially be a large domestic appliance such as a device for care of laundry items for example, a domestic appliance for preparation of foodstuffs, for example a cooking device, such as an oven or a stove, a domestic appliance for storage and conservation of foodstuffs, such as a domestic refrigeration device, for example a refrigerator or a freezer or a refrigerator/freezer combination, an air conditioning device or a dishwasher. A device for care of laundry items can in this case be a washing machine, a tumble dryer or a washer/dryer. The domestic appliance can however also be a small appliance, such as a fully-automatic coffee maker or a kitchen machine.

A portable operating apparatus is understood here especially as a mobile communication device, i.e. preferably a portable terminal, which is embodied for wireless communication in accordance with a predefined communication standard and on which new applications (computer programs) can be installed and then executed. The portable communication terminal can be a cell phone (smartphone) for example, a tablet PC or a comparable mobile terminal, such as an mp3 player with a corresponding communication device and a display device for example. This form of embodiment makes use of the fact that nowadays almost everyone has an intelligent cell phone with a display, so that there is no need to use additional communication devices.

The data communication between the portable operating apparatus on the one side and the domestic appliances on the other side can be carried out for example via a wireless home network, for example a WLAN network and/or via an Internet server. In particular there is provision for the data communication to be carried out via the home network for as long as the portable operating apparatus is located within range of the home network. If the portable operating apparatus is out of range, the data communication can be undertaken via the Internet server, wherein the communication link to the Internet server can especially be set up via a cellular radio network. The domestic appliances can be connected in this case via an assigned communication interface to the home network—namely to a WLAN router.

The changeover between the at-home mode and the not-at-home mode means especially that the user, via the input device of the portable operating apparatus, can change over the domestic appliances both from the not-at-home mode into the at-home mode and also vice versa.

Preferably the portable operating apparatus has a touch-sensitive display device with a touch-sensitive surface as an input device. On this touch-sensitive display device (touchscreen) an operating key—especially a slider switch—can be provided, which serves to change over between the not-at-home mode and the at-home mode. The operating input is thus made through activating the operating key by touching the touch-sensitive display device. Thus the operation is especially intuitive and safe, so that incorrect operation by a user can be prevented.

In addition or as an alternative to the said operating key, the input device can also include a speech recognition system with which speech inputs of the user can be received and evaluated. The changeover between the two modes can also be controlled by speech inputs here, by corresponding speech commands being received by the portable operating apparatus and the one mode or the other mode being activated, depending on these speech commands of the user.

It proves especially advantageous for status data, which characterizes the current operating state of the relevant domestic appliances to be received by the portable operating apparatus from the domestic appliances in the not-at-home mode. If the relevant current operating state of the domestic appliances is known in the portable operating apparatus, the domestic appliances currently activated can be shown on a display device of the portable operating apparatus in the not-at-home mode. Thus the user is informed in the not-at-home mode as to which domestic appliances are currently in operation. Thus, without any great effort, the user can check which domestic appliances he has forgotten to switch off. This proves especially advantageous in the case of a cooking device, for example an oven or a stove, since accidents can possibly be prevented here.

As already stated, first settings are made to the domestic appliances in the at-home mode, while second settings are made to the domestic appliances in the not-at-home mode. The change of settings here can for example include the activation or the deactivation of a domestic appliance and/or the modification of a parameter of a domestic appliance and/or the changeover of a domestic appliance into an energy-saving mode and/or the provision of predefined functionalities by a domestic appliance.

In the not-at-home mode the following forms of embodiment can be provided for example:

The second settings can include that at least one of the domestic appliances, especially a domestic refrigeration appliance, is changed over from a normal mode into an energy-saving mode with a reduced electrical power consumption compared to the normal mode. In this manner electrical energy can be saved.

In addition or as an alternative the second settings can comprise that for at least one of the domestic appliances, especially for an appliance for care of laundry items and/or a dishwasher, after conclusion of an operating program the output of an acoustic signal is suppressed, which is usually output in at-home mode. This too saves electrical energy and also prevents the generation of tedious acoustic signals, by which the neighbors could be disturbed for example.

Furthermore, in addition or as an alternative, the second settings can include at least one of the domestic appliances, especially an appliance for care of laundry items and/or a dishwasher, being changed over to an economy mode in which, by comparison with a normal mode, or by comparison with the at-home mode, an operating process of this domestic appliance is carried out while taking a longer period of time or having a lower power consumption. Since the user is not at home in any event the duration of the operating process can be lengthened, by which electrical energy can be saved.

In not-at-home mode, in addition or as an alternative, there can also be provision for a predefined television broadcast, for example defined in advance by the user, to be recorded by a television receiver. Such a method of operation is especially user-friendly, since favorite television broadcasts will then no longer be missed.

By contrast, in at-home mode, the following (first) settings can be made:

The first settings can include at least one of the domestic appliances, especially the above-mentioned domestic refrigeration appliance, being switched from an energy-saving mode into a normal mode. This domestic appliance is thus fully available.

In addition or as an alternative the first settings can include that for at least one of the domestic appliances, especially for an appliance for care of laundry items and/or a dishwasher, after conclusion of an operating program the output of a message, which will otherwise be transmitted wirelessly to the portable operating apparatus for signaling the conclusion of the operating process, is suppressed. Since the user is at home in any event, a separate message does not need to be transmitted to the portable operating apparatus here.

Furthermore, in addition or as an alternative, a water heater for boiling water can also be activated in at-home mode. Here the portable operating apparatus sends a corresponding control signal to the water heater with which the water heater is activated. This can be done for example directly when changing to the at-home mode, so that the user can immediately make tea for example after returning home.

As already explained, it proves especially advantageous for the first and/or the second settings to also be able to be defined for individual users. In one form of embodiment there is provision for an operator input of the user to be received by the portable operating apparatus, through which for at least one of the domestic appliances the first and/or second settings are made or defined user-specifically. The user can thus define for themselves which functions are to be activated or deactivated in the at-home mode and/or which functions in the not-at-home mode.

In one form of embodiment the portable operating apparatus can include a navigation receiver, through which position data is provided, which characterizes a current position of the operating apparatus. The navigation receiver can involve a GPS receiver for example. The position data thus specifies the current geographical position of the portable operating apparatus. If the current position is known, then at least one of the domestic appliances can also be put into operation and/or deactivated as a function of the current position. Thus the domestic appliances can be controlled in an even more demand-driven manner. This can be implemented for example so that the position-dependent control of the domestic appliances is exclusively made possible in one of the modes, for example exclusively in the at-home mode or exclusively in the not-at-home mode. Alternatively however there can also be provision for the position-dependent control of the domestic appliances to be made possible in both operating modes, namely both in at-home mode and also in not-at-home mode.

If the portable operating apparatus detects, on the basis of the current position, that the operating apparatus is in a predetermined reference area (this corresponds especially to the dwelling area or to the dwelling unit), then immediately or in addition to a predetermined additional criterion having been fulfilled, a control signal can be transferred by the portable operating apparatus to an automatic coffee maker, through which the automatic coffee maker is put into operation and thus coffee is prepared for example. If the user is at home, the coffee is thus made automatically. This proves especially user-friendly early in the morning, since the user can enjoy a cup of coffee after getting up.

There can thus be provision for the current local time to be detected by the portable operating apparatus and for the above-mentioned additional criterion to include the condition that the current local time lies in a predetermined range of values. This range of values is preferably defined by the user himself, so that the automatic coffee maker is only put into operation if on the one hand the user is at home and on the other hand the current local time lies in the predetermined range of values, for example around seven o'clock in the morning.

If position data, which characterizes the current position of the operating apparatus, is provided for the portable operating apparatus by the navigation receiver, then it can be detected by the portable operating apparatus on the basis of the current position and also on the basis of the received status data of a predefined domestic appliance, especially of a cooking device, whether the operating apparatus is located on the one hand outside a predetermined reference area (not at home) and on the other hand whether the predefined domestic appliance is activated. If this is the case, a warning signal can be output by the portable operating apparatus, by means of which the user is notified of the activated state of the domestic appliance. The warning signal can be an acoustic signal or an optical signal for example, which notifies the user that a domestic appliance, especially an oven and/or a stove, is active. The user can thus react accordingly and deactivate the activated domestic appliance again by means of the portable operating apparatus.

As already explained, the portable operating apparatus is preferably embodied as a mobile communication terminal, which communicates with the domestic appliances via a home network and/or an Internet server. Provided the portable communication terminal is located within range of the home network, the data communication can be carried out via this home network. If the portable communication terminal is out of range, the data communication is preferably via the Internet server. If a cell phone is used as a portable terminal for example, the communication link to the Internet server can be set up via a cellular radio network.

The invention also relates to a portable operating apparatus, especially a mobile communication terminal, which is designed to carry out an inventive method.

An inventive system comprises a plurality of domestic appliances as well as an inventive portable operating apparatus.

An inventive computer program product comprises a data medium on which a computer program is stored, which, when executed on a mobile communication terminal, can carry out an inventive method.

The preferred forms of embodiment and their advantages presented in relation to the inventive method apply correspondingly for the inventive operating apparatus, for the inventive system and also for the inventive computer program product.

Further features of the invention emerge from the claims, the figures and the figure description. All features and combinations of features given here in the description, as well as the features and combinations of features given below in the figure description and/or shown in the figures alone, are able to be used not only in the respective combination specified but also in other combinations or on their own.

The invention is explained in greater detail below on the basis of a preferred exemplary embodiment as well as with reference to the enclosed drawings.

DESCRIPTION OF THE INVENTION

Figure 1:
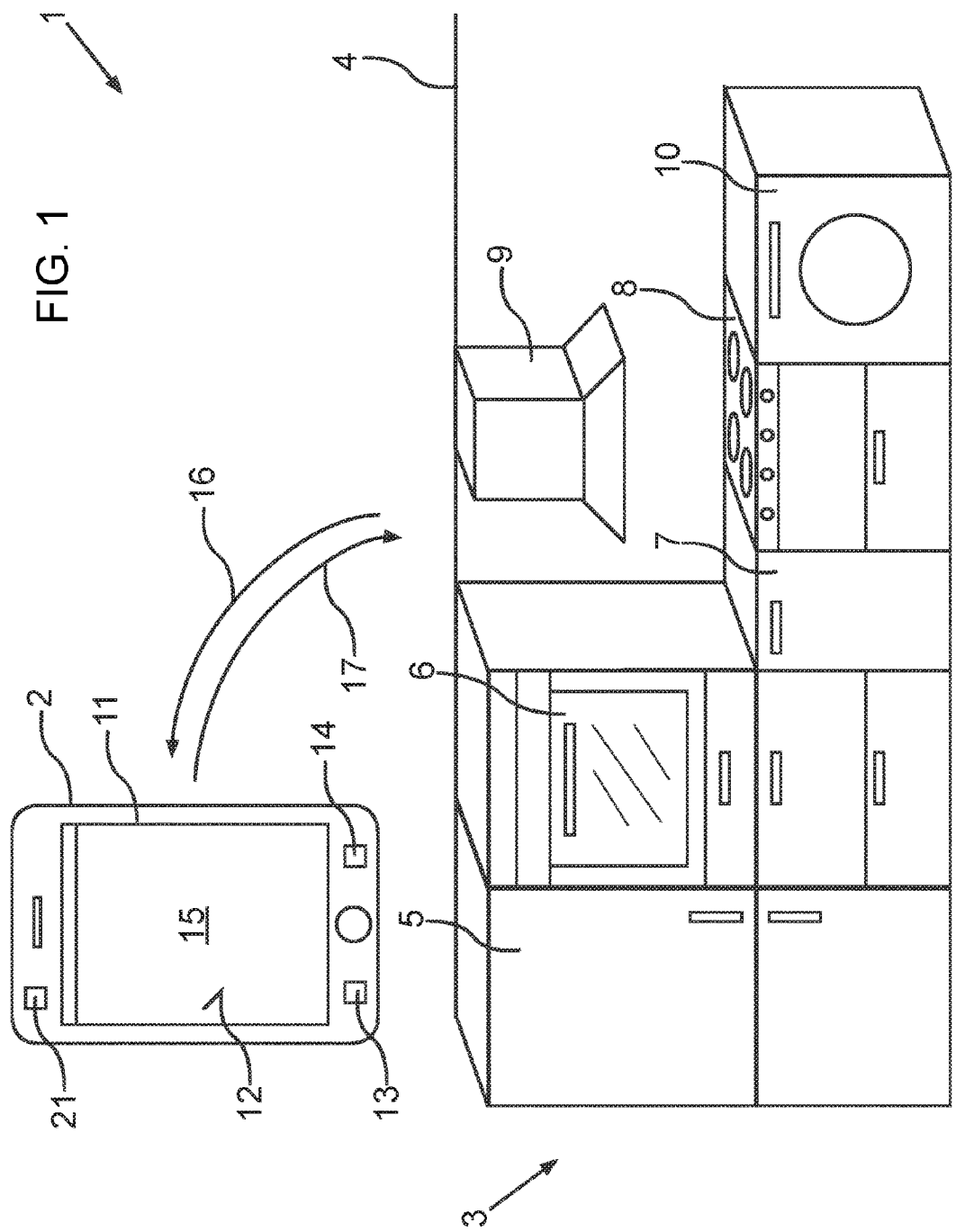
FIG. 1 shows a schematic diagram of a system according to a form of embodiment of the invention.

A system 1 shown in FIG. 1 comprises a portable operating apparatus 2 as well as a plurality of domestic appliances 3, which are set up in a dwelling unit 4 or in a household and can contain the following domestic appliances for example: a domestic refrigeration appliance 5 (for example a refrigerator-freezer combination), an oven 6, a dishwashing machine 7, a stove 8, an extractor hood 9 and also a washing machine 10. The operating apparatus 2 is embodied in the exemplary embodiment as a portable communication terminal, especially as a smartphone, and has a display device 11, which has a touch-sensitive surface 12 and is thus embodied overall as a touch screen.

Disposed in the portable communication terminal is a control unit 13, which is embodied for activating the display device 11 and also receives operator inputs that an operator makes on the touch-sensitive surface 12. In addition the portable operating apparatus 2 comprises a communication device 14, which is embodied for wireless communication with the domestic appliances 3. This communication can be undertaken for example via a wireless home network, for example via a WLAN router, and/or using an Internet server as an agent.

An application is installed as a computer program on the portable operating apparatus 2, which the user can start at any time. This is done by corresponding operating inputs on the touch-sensitive surface 12. If this application is activated, the control unit 13 creates a graphical user interface 15 on the display device 11, via which the domestic appliances 3 can be operated. Via this graphical user interface 15 on the one hand the respective operating states of the domestic appliances 3 can be output; on the other hand the user can control the domestic appliances 3 via the user interface 15, in that corresponding operator inputs are carried out.

Overall status data 16 with information about the current operating state can be transferred from the domestic appliances 3 to the portable operating apparatus 2, while control signals 17 can be transferred by the portable operating apparatus 2 to the domestic appliances 3.

Figure 3:
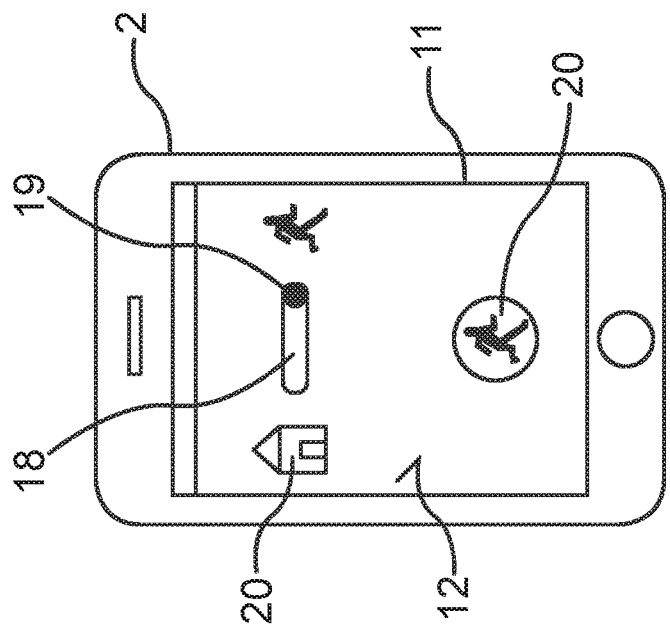
FIG. 3 shows the operating apparatus, wherein a not-at-home mode is activated.
Figure 2:
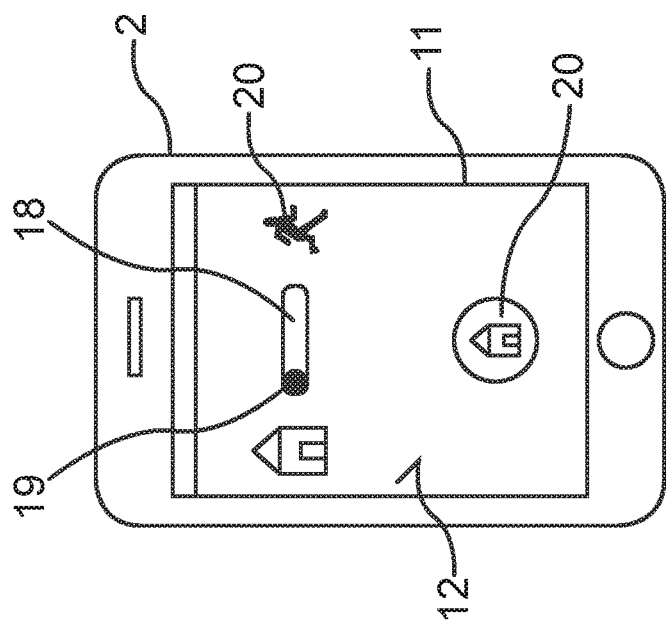
FIG. 2 shows a schematic diagram of a portable operating apparatus according to a form of embodiment of the invention, wherein an at-home mode is activated.

In the user interface 15 a page can be called up which makes it possible for the user to select between an at-home mode and a not-at-home mode of the system 1. Referring to FIG. 2, an operating key 18 is provided on the display device 11, here in the form of a slider switch. By means of the operating key 18 the user can change over between the at-home mode and the not-at-home mode. While in FIG. 2 a slider switch 19 is in a first position and thus the at-home mode is activated, in the example in accordance with FIG. 3 the slider switch 19 is disposed in a second position, through which the not-at-home mode is activated. The respective modes are also identified by graphical symbols 20.

Referring once again to FIG. 1, the operating apparatus 2 can also include a navigation receiver 21, for example a GPS receiver. The navigation receiver 21 provides position data, which characterizes the current geographical position of the operating apparatus 2. This position data is received by the control unit 13, which determines the current position on the basis of the position data.

While first settings are made on the domestic appliances 3 in the at-home mode, in the not-at-home mode second settings are made on the domestic appliances 3. These are described in more detail below:

The following functionalities are provided in the at-home mode for example:

at least one of the domestic appliances 3, especially the domestic refrigeration appliance 5, is changed over from an energy-saving mode into a normal mode, and/or for at least one of the domestic appliances 3, especially for the washing machine 10 and/or the dishwasher 7, after conclusion of an operating program, the issuing of a message, which is otherwise communicated in the not-at-home mode to the portable operating apparatus 2 for signaling the conclusion of the operating process, is suppressed, and/or a water heater is activated to boil water.

By contrast the following changes are made in the not-at-home mode:

at least one of the domestic appliances 3, especially the domestic refrigeration appliance 5, is changed over from the normal mode into the energy-saving mode with a reduced electrical energy consumption, and/or at least one of the domestic appliances 3, especially the washing machine 10 and/or the dishwasher 7, is changed over to an economy mode, in which an operating process of this domestic appliance 3, by comparison with a normal mode, is carried out while taking a longer period of time and consuming less electrical energy, and/or for at least one of the domestic appliances 3, especially for the washing machine 10 and/or the dishwasher 7, after conclusion of an operating program, the output of an acoustic signal that is output in at-home mode is suppressed, and/or a pre-specified television broadcast is recorded by means of a television receiver.

During the activation of the domestic appliances 3 the control unit 13 of the portable operating apparatus 2 can also take account of the current position of the portable operating apparatus 2. In this case the control unit 13 can compare the current position with a reference area, which corresponds to the dwelling unit 4 or to the household. Thus the control unit 13 can determine whether the operating apparatus 2 and thus also the user is at home or is outside the dwelling unit 4. Depending thereupon, at least one of the domestic appliances 3 can then be put into operation and/or deactivated. This can for example take the form of an automatic coffee maker, not shown in the figure, being put into operation if on the one hand the operating apparatus 2 is located within the said reference area and on the other hand the current local time also lies in a predetermined range of values. For example coffee can be made at seven o'clock in the morning, when the user is at home.

If it is detected by the control unit 13 that the user is outside the dwelling unit 4 and one of the domestic appliances 3—especially the stove 8 and/or the oven 6—is activated, then a warning signal can be output by the operating apparatus 2, via the display device 11 and/or a loudspeaker for example. Thus the user is notified that he has forgotten to switch off the stove 8 for example.

If the not-at-home mode is activated by the user, then those domestic appliances 3 that are currently activated are also displayed or signaled (for example in text form) on the display device 11 in the user interface 15. Thus, in a simple and especially intuitive way, the user can obtain an overview of which of the domestic appliances 3 are currently active and may need to be switched off.

LIST OF REFERENCE CHARACTERS

1 System
2 Operating apparatus
3 Domestic appliances
4 Dwelling unit
5 Domestic refrigeration appliance 6 Oven
7 Dishwasher
8 Stove
9 Extractor hood
10 Washing machine
11 Display device
12 Touch-sensitive surface
13 Control unit
14 Communication device
15 Graphical user interface
16 Status data
17 Control signals
18 Operating key
19 Slider switch
20 Symbols
21 Navigation receiver

The invention claimed is:

1. A method for controlling a plurality of domestic appliances, the method comprising the following steps:
using a portable operating apparatus to communicate wirelessly with the domestic appliances;
entering an operator input into the portable operating apparatus by a user through an input device of the portable operating apparatus;
emitting a control signal from the portable operating apparatus for changing over the domestic appliances as a result of the operator input entered by the user;
transferring the control signal from the portable operating apparatus to the domestic appliances to jointly change-over the domestic appliances between an at-home mode in which first settings are made at the domestic appliances and a not-at-home mode in which second settings are made at the domestic appliances;
using a navigation receiver of the portable operating apparatus to provide position data characterizing a current position of the operating apparatus; and
outputting a warning signal from the portable operating apparatus notifying the user about an activated state of the domestic appliance, if the portable operating apparatus detects on a basis of the current position and on a basis of received status data of a pre-specified domestic cooking appliance that the operating apparatus is located outside a predetermined reference area and the pre-specified domestic cooking appliance is activated.

2. The method according to claim 1, which further comprises providing an operating key on a touch-sensitive display device as the input device of the portable operating apparatus, and entering the operator input by actuating the operating key by touching the touch-sensitive display device.

3. The method according to claim 1, which further comprises, in the not-at-home mode, sending status data characterizing a current operating state of the respective domestic appliances from the domestic appliances to the portable operating apparatus, and showing the domestic appliances being currently activated on a display device of the portable operating apparatus.

4. The method according to claim 1, wherein the second settings include at least one of:
a) changing-over at least one of the domestic appliances from a normal mode into an energy-saving mode with a reduced electrical power consumption, or
b) switching-over at least one of the domestic appliances to an economy mode in which, by comparison with a normal mode, an operating process of the at least one domestic appliance is carried out while taking a longer period of time or having a lower power consumption, or
c) suppressing an output of an acoustic signal being output in the at-home mode for at least one of the domestic appliances after conclusion of an operating program, or
d) recording a pre-specified television broadcast on a television receiver.

5. The method according to claim 4, wherein:
the at least one domestic appliance in second setting a) is a domestic refrigeration appliance; and
the at least one domestic appliance in second settings b) and c) is at least one of an appliance for care of laundry items or a dishwasher.

6. The method according to claim 1, wherein the first settings include at least one of:
a) changing-over at least one of the domestic appliances from an energy-saving mode into a normal mode, or
b) suppressing an output of an acoustic signal and transferring the output of the acoustic signal to the portable operating apparatus in the not-at-home mode for signaling a conclusion of an operating process for at least one of the domestic appliances after a conclusion of an operating program, or
c) activating a water heater to boil water.

7. The method according to claim 6, wherein:
the at least one domestic appliance in first setting a) is a domestic refrigeration appliance; and
the at least one domestic appliance in first setting b) is at least one of an appliance for care of laundry items or a dishwasher.

8. The method according to claim 1, wherein the operator input of the user is received by the portable operating apparatus and defines at least one of the first or second settings for an individual user for at least one of the domestic appliances.

9. The method according to claim 1, which further comprises using a navigation receiver of the portable operating apparatus to provide position data characterizing a current position of the operating apparatus, and at least one of putting at least one of the domestic appliances into operation as a function of the current position or deactivated at least one of the domestic appliances as a function of the current position.

10. The method according to claim 9, which further comprises upon a detection by the portable operating apparatus that the portable operating apparatus is located in a predetermined reference area based on the current position and immediately after fulfilling a predetermined additional criterion, using the portable operating apparatus to transfer a control signal to an automatic coffee making machine causing the automatic coffee making machine to be put into operation.

11. The method according to claim 10, which further comprises detecting a current local time by using the portable operating apparatus, and including the current local time in a predetermined range of values in the predetermined additional criterion.

12. The method according to claim 1, wherein the portable operating apparatus is a mobile communication terminal communicating with the domestic appliances over at least one of a home network or an Internet server.

13. A portable operating apparatus for communicating wirelessly with domestic appliances, the portable operating apparatus comprising:

an input device allowing a user to enter an operator input into the portable operating apparatus;

a communication device emitting a control signal for changing over the domestic appliances as a result of the operator input entered by the user and transferring the control signal to the domestic appliances to jointly change-over the domestic appliances between an at-home mode in which first settings are made at the domestic appliances and a not-at-home mode in which second settings are made at the domestic appliances;

a navigation receiver providing position data characterizing a current position of the operating apparatus; and a control unit outputting a warning signal notifying the user about an activated state of the domestic appliance, if the portable operating apparatus detects on a basis of the current position and on a basis of received status data of a pre-specified domestic cooking appliance that the operating apparatus is located outside a predetermined reference area and the pre-specified domestic cooking appliance is activated.

14. The portable operating apparatus according to claim 13, wherein the portable operating apparatus is a mobile communication terminal.

15. A system, comprising:
a plurality of domestic appliances; and
a portable operating apparatus according to claim 13.

16. A non-transitory computer-readable medium with instructions stored thereon, that when executed on a mobile communication terminal, performs the method according to claim 1.

* * * * *